US012722189B2

(12) United States Patent
Liao et al.

(10) Patent No.: US 12,722,189 B2
(45) Date of Patent: Sep. 1, 2026

(54) AIR-BLOWING ROLLER, DUST REMOVAL APPARATUS AND METHOD

(71) Applicant: CONTEMPORARY AMPEREX TECHNOLOGY (HONG KONG) LIMITED, Hong Kong (CN)

(72) Inventors: Ruhu Liao, Ningde (CN); Quanshui Cai, Ningde (CN); Gang Zeng, Ningde (CN); Jingjing Wei, Ningde (CN); Ya Dai, Ningde (CN); Jianlei Wang, Ningde (CN); Guangsheng Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 127 days.

(21) Appl. No.: 18/678,482

(22) Filed: May 30, 2024

(65) Prior Publication Data

US 2024/0316602 A1 Sep. 26, 2024

Related U.S. Application Data

(63) Continuation of application No. PCT/CN2022/132644, filed on Nov. 17, 2022.

(30) Foreign Application Priority Data

Dec. 8, 2021 (CN) ......................... 202111489694.6

(51) Int. Cl.
*B08B 13/00* (2006.01)
*B08B 5/02* (2006.01)

(52) U.S. Cl.
CPC .................................... *B08B 5/026* (2013.01)

(58) Field of Classification Search
None
See application file for complete search history.

(56) References Cited

U.S. PATENT DOCUMENTS

| | | | |
|---|---|---|---|
| 5,490,300 | A | 2/1996 | Horn |
| 2020/0122492 | A1 | 4/2020 | Campbell et al. |

FOREIGN PATENT DOCUMENTS

| | | | |
|---|---|---|---|
| CN | 201234955 | Y | 5/2009 |
| CN | 201990853 | U | 9/2011 |
| CN | 208712429 | U | 4/2019 |
| CN | 209049831 | U | 7/2019 |

(Continued)

OTHER PUBLICATIONS

Google Patents translation of CN201234955Y (Year: 2025).*

(Continued)

*Primary Examiner* — Eric W Golightly
(74) *Attorney, Agent, or Firm* — ANOVA LAW GROUP, PLLC

(57) ABSTRACT

An air-blowing roller includes: a roller body, where a plurality of air outlets are disposed on an outer peripheral surface of the roller body, the plurality of air outlets are arranged along an axial direction of the roller body, an air exhaust direction of the air outlets is tangent to the outer peripheral surface of the roller body, and air exhaust directions of the plurality of air outlets are consistent. A dust removal apparatus includes a conveyance mechanism, an air-blowing roller assembly, and an air intake roller assembly.

16 Claims, 7 Drawing Sheets

(56) References Cited

FOREIGN PATENT DOCUMENTS

| | | | |
|---|---|---|---|
| CN | 211036446 | U | 7/2020 |
| CN | 212796190 | U | 3/2021 |
| CN | 215031424 | U | 12/2021 |
| DE | 19949753 | A1 | 5/2000 |
| EP | 1426485 | A1 | 6/2004 |
| WO | 2007004308 | A1 | 1/2007 |
| WO | 2015124488 | A1 | 8/2015 |

OTHER PUBLICATIONS

Google Patents translation of CN211036446U (Year: 2025).*
The European Patent Office (EPO) The Extended European Search Report for Application No. 22903162.0 Nov. 28, 2024 103 Pages.
The World Intellectual Property Organization (WIPO) International Search Report and Written Opinion for PCT/CN2022/132644 Feb. 16, 2023 16 Pages (including translation).

* cited by examiner

AIR-BLOWING ROLLER, DUST REMOVAL APPARATUS AND METHOD

CROSS-REFERENCE TO RELATED APPLICATIONS

This application is a continuation of International Application No. PCT/CN2022/132644, filed on Nov. 17, 2022, which claims priority to Chinese Patent Application No. 202111489694.6, filed on Dec. 8, 2021 and entitled "AIR-BLOWING ROLLER, DUST REMOVAL APPARATUS AND METHOD", the entire contents of which are incorporated herein by reference.

TECHNICAL FIELD

This application relates to the field of dust removal technology, and in particular, to an air-blowing roller and a dust removal apparatus and method.

BACKGROUND

During product processing, the surface of a product needs to be dusted and cleaned. Common dust removal methods include air-blowing dusting, negative pressure dusting, adhesion dusting, and the like. However, the surfaces of some workpieces-to-be-cleaned are relatively soft, porous, or coated, and hard dust is embedded in the surfaces of the workpieces-to-be-cleaned and is difficult to remove. The common dust removal methods are ineffective in removing dust from such workpieces-to-be-cleaned.

SUMMARY

To solve the above problem, this application discloses an air-blowing roller and a dust removal apparatus and method that achieve a good dusting effect.

In a first aspect, an embodiment of this application discloses an air-blowing roller, including: a roller body, where a plurality of air outlets are disposed on an outer peripheral surface of the roller body, the plurality of air outlets are arranged along an axial direction of the roller body, an air exhaust direction of the air outlets is tangent to the outer peripheral surface of the roller body, and air exhaust directions of the plurality of air outlets are consistent.

The air-blowing roller according to this embodiment of this application in the first aspect drives the air outlets to move synchronously during rotation. On the one hand, during the rotation of the air-blowing roller, the air outlets of the air-blowing roller gradually approach the surface of the workpiece-to-be-cleaned. The air exhaust direction of the air outlets change from a direction perpendicular to the surface of the workpiece-to-be-cleaned to a direction parallel to the surface of the workpiece-to-be-cleaned. The air outlet side of the air-blowing roller is close to the surface of the workpiece-to-be-cleaned. In the volume of air exhausted from the air outlets, a component perpendicular to the surface of the workpiece-to-be-cleaned gradually decreases. When the air outlets are closest to the surface of the workpiece-to-be-cleaned, the air exhaust direction of the air outlets is parallel to the surface of the workpiece-to-be-cleaned, thereby preventing dust from being embedded into the surface of the workpiece-to-be-cleaned. On the other hand, during rotation of the air-blowing roller, when the air exhaust direction of the air outlets is parallel to the surface of the workpiece-to-be-cleaned, the airflow from the air outlets is endowed with an initial speed of leaving the surface of the workpiece-to-be-cleaned when being exhausted along a tangential direction of the roller body, thereby lifting the dust from the surface of the workpiece-to-be-cleaned of the product, bringing the dust away from the surface of the workpiece-to-be-cleaned, and achieving a good dusting effect.

According to some embodiments of this application, the air exhaust direction of the air outlets is inclined to a central axis of the roller body.

In the above technical solution, when the workpiece-to-be-cleaned is a web and the central axis of the roller body extends along the width direction of the web, the air exhaust direction of the air outlets is inclined to the conveyance direction of the web, thereby driving the dust to leave the web from the widthwise edge of the web, thereby achieving a good dusting effect.

According to some embodiments of this application, the air-blowing roller further includes a plurality of ducts. The ducts extend spirally around the central axis of the roller body. One end of each duct is an air inlet and another end of each duct is an air outlet. The plurality of ducts are arranged in parallel.

In the above solution, each air outlet corresponds to an duct, thereby improving uniformity of the air volume between a plurality of air outlets. The ducts extend spirally around the central axis of the roller body, thereby causing the air direction in the ducts to extend spirally around the central axis of the roller body. The extension direction of the ducts is the same as the air exhaust direction of the air outlets, and the exhaust air resistance of the ducts is relatively small, thereby achieving a good denoising effect.

According to some embodiments of this application, spacings between every two adjacent ducts are identical.

In the above technical solutions, a plurality of ducts are evenly arranged on the roller body, thereby simplifying the structure of the air-blowing roller and facilitating the assembling and maintenance of the air-blowing roller. The spacings between every two adjacent air outlets are identical, thereby enabling the air-blowing roller to exhaust air evenly along the axial direction.

According to some embodiments of this application, a plurality of spiral grooves are disposed on the outer peripheral surface of the roller body. The spiral grooves spirally extend around the central axis of the roller body. The plurality of spiral grooves are arranged in parallel. The ducts are blast pipes. The plurality of blast pipes are correspondingly embedded in the plurality of spiral grooves.

In the above technical solution, the ducts are blast pipes, thereby simplifying the structure of the roller body and reducing the molding cost of the ducts. The blast pipes are embedded in the corresponding spiral grooves, thereby not only facilitating the fixing and assembling of the blast pipes to the roller body, but also reducing the increment in the outer dimension of the air-blowing roller caused by the mounting of the blast pipes, thereby making the air-blowing roller structurally compact and space-efficient.

According to some embodiments of this application, a plurality of spiral grooves are disposed on the outer peripheral surface of the roller body. The spiral grooves spirally extend around the central axis of the roller body. The plurality of spiral grooves are arranged in parallel. The air-blowing roller further includes a housing. The housing covers the outer peripheral surface of the roller body. The spiral grooves and an inner wall of the housing jointly define the ducts.

In the above solution, the spiral grooves and the inner wall of the housing jointly define the ducts, thereby reducing the number of components of the air-blowing roller and simplifying the structure of the air-blowing roller.

According to some embodiments of this application, a relief groove is disposed on the outer peripheral surface of the roller body. The relief groove extends along the axial direction of the roller body. The air outlets are disposed on a sidewall of the relief groove.

In the above technical solution, by disposing a relief groove on the outer peripheral surface of the roller body, the air exhaust path of the air outlets is smoother, and the air exhaust direction of the air outlets is caused to extend along the tangential direction of the roller body. The air outlets are disposed on a sidewall of the relief groove. The air outlets are disposed without additionally increasing the outer diameter dimension of the roller body, thereby making the air-blowing roller structurally compact and space-efficient.

According to some embodiments of this application, the air-blowing roller further includes an air inlet portion. The air inlet portion is located at one end of the roller body. The air inlet of each duct communicates with the air inlet portion.

In the above technical solution, the air source communicates with the air inlet portion. The air inlet portion communicates with the plurality of air inlets. The air source enters each duct through the air inlet portion. The air source includes a connector that communicates with the air inlet portion to feed air into the air-blowing roller, thereby simplifying the structure of the air source.

According to some embodiments of this application, the air inlet portion includes a main pipe and a plurality of branch pipes. The main pipe is configured to be connected to an air source. The plurality of branch pipes are disposed corresponding to the plurality of ducts. One end of each branch pipe is connected to the main pipe. Another end of each branch pipe is connected to a corresponding duct.

In the above technical solution, the air source enters the corresponding duct through the main pipe and branch pipe, and exits from the corresponding air outlet. During supply of air, the air source does not accumulate inside the air-blowing roller. The air volume from the air source is identical to the air volume from the air-blowing roller, thereby effectively reducing the depletion of the air source during conveyance.

An embodiment of this application in a second aspect discloses a dust removal apparatus, including: a conveyance mechanism, configured to convey a workpiece-to-be-cleaned; and the air-blowing roller according to an embodiment of this application in the first aspect, where the air-blowing roller is disposed downstream of the conveyance mechanism, and the air-blowing roller is configured to blow air to a surface of the workpiece-to-be-cleaned.

In the dust removal apparatus disclosed in an embodiment of this application in the second aspect, the conveyance mechanism conveys the workpiece-to-be-cleaned, and the air-blowing roller blows air to the surface of the workpiece-to-be-cleaned.

With the air-blowing roller according to an embodiment of this application in the first aspect, on the one hand, during the rotation of the air-blowing roller, the air outlet side of the air-blowing roller is close to the surface of the workpiece-to-be-cleaned. In the volume of air exhausted from the air outlets, a component perpendicular to the surface of the workpiece-to-be-cleaned gradually decreases, thereby preventing the dust from being blown onto the surface of the workpiece-to-be-cleaned. On the other hand, when the air outlets are away from the surface of the workpiece-to-be-cleaned, the airflow from the air outlets lifts the dust away from the surface of the workpiece-to-be-cleaned, thereby preventing the dust from accumulating on the surface of the workpiece-to-be-cleaned. Due to the above characteristics of the air-blowing roller, the dust removal apparatus according to this embodiment of this application in the second aspect also achieves a good dusting effect.

According to some embodiments of this application, a pair of air-blowing rollers are disposed, and a gap available for the workpiece-to-be-cleaned to pass through exists between the air-blowing rollers in the pair.

In the above technical solution, the workpiece-to-be-cleaned passes through the gap between the air-blowing rollers in the pair. Each air-blowing roller corresponds to a surface of the workpiece-to-be-cleaned on one side. In this way, both surfaces of the workpiece-to-be-cleaned can be dusted simultaneously, thereby achieving high dusting efficiency.

According to some embodiments of this application, the dust removal apparatus further includes an air intake roller. The air intake roller is located downstream of the air-blowing roller along a conveyance direction of the piece-to-be-cleaned.

In the above technical solution, the air intake roller is disposed downstream of the air-blowing roller, and takes the exhaust air flow from the air-blowing roller into the air intake roller. In this way, the dust on the surface of the workpieces-to-be-cleaned is taken away by the exhaust air flow, thereby achieving a good dusting effect.

An embodiment of this application in a third aspect discloses a dust removal method, including:

- providing an air-blowing roller, where the air-blowing roller includes a roller body, a plurality of air outlets are disposed on an outer peripheral surface of the roller body, the plurality of air outlets are arranged along an axial direction of the roller body, an air exhaust direction of the air outlets is tangent to the outer peripheral surface of the roller body, and air exhaust directions of the plurality of air outlets are consistent; and
- passing a workpiece-to-be-cleaned through the air-blowing roller, and rotating the air-blowing roller to blow air onto a surface of the workpiece-to-be-cleaned.

With the air-blowing roller according to an embodiment of this application in the first aspect, on the one hand, during the rotation of the air-blowing roller, the air outlet side of the air-blowing roller is close to the surface of the workpiece-to-be-cleaned. In the volume of air exhausted from the air outlets, a component perpendicular to the surface of the workpiece-to-be-cleaned gradually decreases, thereby preventing the dust from being blown onto the surface of the workpiece-to-be-cleaned. On the other hand, when the air outlets are away from the surface of the workpiece-to-be-cleaned, the airflow from the air outlets lifts the dust away from the surface of the workpiece-to-be-cleaned, thereby preventing the dust from accumulating on the surface of the workpiece-to-be-cleaned. Due to the characteristics of the air-blowing roller, the dust removal method can effectively remove the dust on the surface of the workpiece-to-be-cleaned, and achieves a good dusting effect.

According to some embodiments of this application, the dust removal method includes: providing a pair of air-blowing rollers; and passing the workpiece-to-be-cleaned through a gap between the air-blowing rollers in the pair, and controlling the pair of air-blowing rollers to rotate along opposite directions to blow air onto the surface of the workpiece-to-be-cleaned.

In the above technical solution, the workpiece-to-be-cleaned passes through the gap between the air-blowing rollers in the pair. Each air-blowing roller corresponds to a surface of the workpiece-to-be-cleaned on one side. The air-blowing rollers in the pair rotate in opposite directions to simultaneously dust both surfaces of the workpiece-to-be-cleaned, blow the dust to the same side along the conveyance direction of the workpieces-to-be-cleaned, thereby making it convenient for the air intake roller to collect dust on both surfaces of the workpiece-to-be-cleaned simultaneously, and achieving high dusting efficiency.

According to some embodiments of this application, the controlling the pair of air-blowing rollers to rotate along opposite directions to blow air onto the surface of the workpiece-to-be-cleaned includes: controlling a rotational phase difference between the two air-blowing rollers to be 180°, so that the two air-blowing rollers alternately blow air to the surface of the workpiece-to-be-cleaned.

In the above technical solution, the two air-blowing rollers are disposed on the two sides of the workpiece-to-be-cleaned respectively. The two air-blowing rollers alternately blow air to the surface of the workpiece-to-be-cleaned, and alternately apply an air pressure to both surfaces of the workpiece-to-be-cleaned, thereby causing the workpiece-to-be-cleaned to shake off the dust and separate the dust from the surface of the workpiece-to-be-cleaned, and achieving a good dusting effect.

According to some embodiments of this application, the rotating the air-blowing roller to blow air onto a surface of the workpiece-to-be-cleaned includes:

- starting to blow air from the air outlets when the air-blowing roller rotates to move the air outlets to a side close to the surface of the workpiece-to-be-cleaned and the air exhaust direction is parallel to the surface of the workpiece-to-be-cleaned; and
- stopping blowing air from the air outlets when the air-blowing roller rotates to move the air outlets to a side back from the surface of the workpiece-to-be-cleaned and the air exhaust direction is perpendicular to the surface of the workpiece-to-be-cleaned.

In the above technical solution, not only can the air volume required by the air-blowing roller in the dusting operation be reduced to cut back the dusting cost, but also the air blow to the surface of the workpiece-to-be-cleaned can be stopped when the airflow from the air outlets contains a component blowing vertically to the surface of the workpiece-to-be-cleaned, thereby further preventing the dust from being blown onto the surface of the workpiece-to-be-cleaned.

Additional aspects and advantages of this application will be partly given in the following description, and a part thereof will become evident in the following description or will be learned in the practice of this application.

BRIEF DESCRIPTION OF DRAWINGS

To describe technical solutions in embodiments of this application more clearly, the following outlines the drawings to be used in the embodiments. Understandably, the following drawings show merely some embodiments of this application, and therefore, are not intended to limit the scope. A person of ordinary skill in the art may derive other related drawings from the drawings without making any creative efforts.

Figure 1:
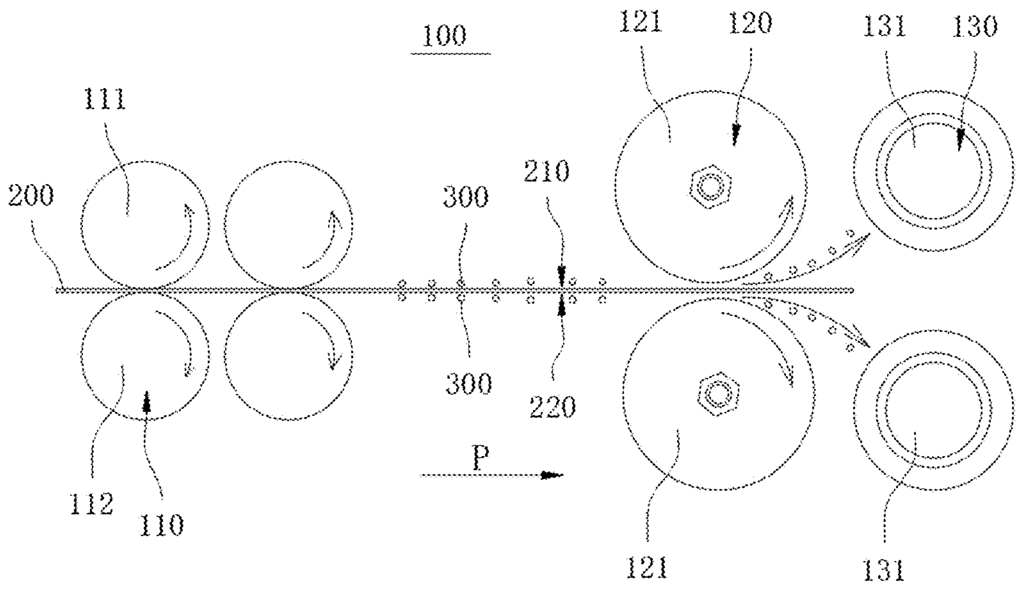
FIG. 1 and FIG. 2 are schematic structural diagrams of a dust removal apparatus from two different viewing angles according to some embodiments of this application.

The drawings are not necessarily drawn to scale.

List of reference numerals: 100—dust removal apparatus; 110—conveyance mechanism; 111—drive roller; 112—driven roller; 120—air-blowing roller assembly; 121—air-blowing roller; 121*a*—first air-blowing roller; 121*b*—second air-blowing roller; 1211—roller body; 12111—outer peripheral surface; 12112—first end; 12113—second end; 12114—spiral groove; 12115—relief groove; 12116—first sidewall; 12117—second sidewall; 12118—via-hole; 1212—duct; 12121—air inlet; 12122—air outlet; 1213—housing; 12131—inner wall; 12132—air vent; 1214—air inlet portion; 12141—main pipe; 12142—branch pipe; 130—air intake roller assembly; 131—air intake roller; 200—workpiece-to-be-cleaned; 210—first surface; 220—second surface; 300—dust; P—first preset direction; N—second preset direction; Q—first axis; O1—third preset direction; O2—fourth preset direction.

DETAILED DESCRIPTION OF EMBODIMENTS

To make the objectives, technical solutions, and advantages of the embodiments of this application clearer, the following gives a clear description of the technical solutions in some embodiments of this application with reference to the drawings in some embodiments of this application. Evidently, the described embodiments are merely a part rather than all of the embodiments of this application. All other embodiments derived by a person of ordinary skill in the art based on the embodiments of this application without making any creative efforts still fall within the protection scope of this application.

Unless otherwise defined, all technical and scientific terms used herein have the same meanings as what is normally understood by a person skilled in the technical field of this application. The terms used in the specification of this application are merely intended to describe specific embodiments but not intended to limit this application. The terms “include” and “contain” and any variations thereof used in the specification, claims, and brief description of drawings of this application are intended as non-exclusive inclusion. The terms such as “first” and “second” used in the specification, claims, and brief description of drawings herein are intended to distinguish between different items, but are not intended to describe a specific sequence or order of precedence.

Reference to “embodiment” in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that an embodiment described in this application may be combined with another embodiment.

In the description of this application, unless otherwise expressly specified and defined, the terms “mount”, “concatenate”, “connect”, and “attach” are understood in a broad sense. For example, a “connection” may be a fixed connection, a detachable connection, or an integrated connection; or may be a direct connection or an indirect connection implemented through an intermediary; or may be internal communication between two components. A person of ordinary skill in the art is able to understand the specific meanings of the terms in this application according to specific situations.

“A plurality of” referred to in this application means two or more (including two).

In the related art, dust on a surface of a workpiece-to-be-cleaned is removed by blowing air onto the surface. However, because the surfaces of some workpieces-to-be-cleaned are soft, coated or porous or for other reasons, hard dust may be embedded into the surface of the workpiece-to-be-cleaned, and is unable to be removed effectively by ordinary air-blowing dust removal methods, thereby resulting in quality problems of the products containing the workpiece-to-be-cleaned.

The applicant finds through research that in a process of blowing air to the surface of the workpiece-to-be-cleaned, the exhaust air direction is usually fixed, and may be perpendicular to the surface of the workpiece-to-be-cleaned, or may be inclined toward the surface of the workpiece-to-be-cleaned. No matter whether the exhaust air direction is perpendicular to or inclined toward the surface of the workpiece-to-be-cleaned, an airflow component perpendicular to the surface of the workpiece-to-be-cleaned exists. With the dust adhering to the surface of the workpiece-to-be-cleaned, the airflow component perpendicular to the surface of the workpiece-to-be-cleaned may cause the dust to be further inserted into the workpiece-to-be-cleaned and hardly separable from the workpiece-to-be-cleaned.

In view of the above situation, this application provides a new technical solution, in which the dust is removed from the surface of the workpiece-to-be-cleaned by blowing air, and the exhaust air direction changes periodically. In a process of blowing air to the workpiece-to-be-cleaned, not only can the airflow component perpendicular to the surface of the workpiece-to-be-cleaned be reduced, but also the airflow brings the dust away from the surface of the workpiece-to-be-cleaned, thereby achieving a good dusting effect. The following describes details of the technical solution.

Figure 2:
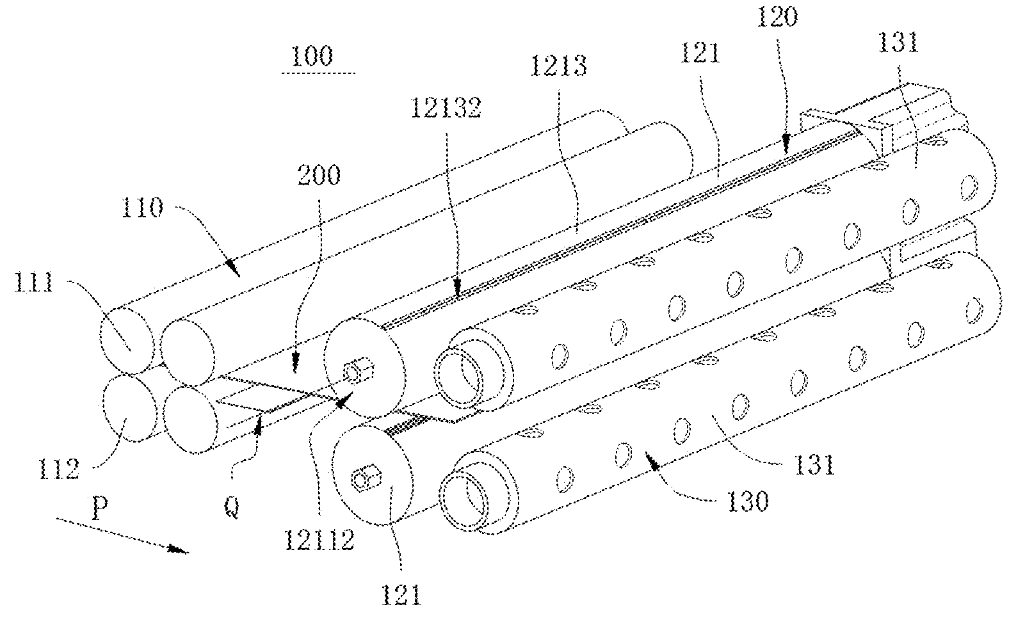

FIG. 1 and FIG. 2 are schematic structural diagrams of a dust removal apparatus from two different viewing angles according to some embodiments of this application.

As shown in FIG. 1 and FIG. 2, some embodiments of this application disclose a dust removal apparatus 100, including a conveyance mechanism 110, an air-blowing roller assembly 120, and an air intake roller assembly 130. The air-blowing roller assembly 120 includes an air-blowing roller 121. The air intake roller assembly 130 includes an air intake roller 131. The conveyance mechanism 110 is configured to convey a workpiece-to-be-cleaned along a first preset direction P. The air-blowing roller 121 is located downstream of the conveyance mechanism 110. The air-blowing roller 121 is configured to blow air to a surface of the workpiece-to-be-cleaned. The air intake roller 131 is located downstream of the air-blowing roller 121. The air intake roller 131 is configured to provide a negative pressure to guide surrounding airflow into the air intake roller 131.

Understandably, two surfaces of the workpiece-to-be-cleaned 200 along a thickness direction thereof are a first surface 210 and a second surface 220 respectively. One of the surfaces may be coated with a coating layer, or both the first surface 210 and the second surface 220 may be coated with a coating layer.

Understandably, the first preset direction P may extend along a horizontal direction, or may extend along a direction inclined to the horizontal direction or along a vertical direction.

In some embodiments of this application, the workpiece-to-be-cleaned 200 is an electrode plate web. A surface of the electrode plate web is coated with an active material layer. Metal dust may be formed during cutting of the electrode plate web. An active material layer on the electrode plate web is relatively soft, and the metal dust may be embedded in the active material layer. The metal dust intrudes into an electrode assembly formed by winding the electrode plate web. A battery cell containing the electrode assembly may be short-circuited in use, thereby posing severe safety hazards. In other embodiments, the workpiece-to-be-cleaned 200 may be another type of workpiece-to-be-cleaned, for example, adhesive tape coated with a binder on the surface, porous cushioning tape, a housing with an anti-wear layer on the surface, or a product with a surface made of sponge.

The conveyance mechanism 110 includes at least one pair of conveyance roller assemblies. A conveyance roller assembly includes a drive roller 111 and a driven roller 112 disposed opposite to each other. The workpiece-to-be-cleaned 200 passes between the drive roller 111 and the driven roller 112. The drive roller 111 and the driven roller 112 jointly clamp the workpiece-to-be-cleaned 200 and convey the workpiece-to-be-cleaned 200 along a first preset direction P. In some embodiments of this application, two pairs of conveyance roller assemblies are disposed. The two pairs of conveyance roller assemblies are spaced apart along the first preset direction P. The two pairs of conveyance roller assemblies jointly convey the workpiece-to-be-cleaned 200. In some other embodiments, one pair of conveyance roller assemblies is disposed, or two or more pairs of conveyance roller assemblies are disposed, to convey the workpiece-to-be-cleaned 200.

The width direction of the workpiece-to-be-cleaned 200 is perpendicular to the first preset direction P. In some embodiments of this application, a central axis of the air-blowing roller 121 is parallel to the width direction of the workpiece-to-be-cleaned 200. In other embodiments, the central axis of the air-blowing roller 121 may be inclined to the width direction of the workpiece-to-be-cleaned 200. In some embodiments of this application, the central axes of the drive roller 111, the driven roller 112, the air-blowing roller 121, and the air intake roller 131 are parallel to each other. In some other embodiments, the relationship between the central axes of the drive roller 111, the driven roller 112, the air-blowing roller 121, and the air intake roller 131 is not limited.

As shown in FIG. 1 and FIG. 2, based on the implementation of "the first surface 210 of the workpiece-to-be-cleaned 200 is coated with a coating layer", the air-blowing roller assembly 120 includes one air-blowing roller 121, and the air intake roller assembly 130 includes one air intake roller 131. Both the air-blowing roller 121 and the air intake roller 131 are arranged corresponding to the first surface 210. The air-blowing roller 121 blows air to the first surface 210, and the air intake roller 131 provides a negative pressure environment and guides the airflow to bring the dust 300 away from the first surface 210. Based on the implementation of "both the first surface 210 and the second surface 220 of the workpiece-to-be-cleaned 200 are coated with a coating layer", the air-blowing roller assembly includes a pair of air-blowing rollers, and the air intake roller assembly 130 includes a pair of air intake rollers 131. A gap exists available for the workpiece-to-be-cleaned 200 to pass through exists between the air-blowing rollers in the pair. A gap available for the workpiece-to-be-cleaned 200 to pass through exists between the air intake rollers 131 in the pair. The workpiece-to-be-cleaned 200 successively passes through the gap between the air-blowing rollers and the gap between the air intake rollers 131. The air-blowing roller 121 and the air intake roller 131 on a side at which the first surface 210 is located remove dust from the first surface 210. The air-blowing roller 121 and the air intake roller 131 on a side at which the second surface 220 is located remove dust from the second surface 220. In some other embodiments, the dust removal apparatus for the workpiece-to-be-cleaned 200 is applicable to dusting of other types of workpieces-to-be-cleaned 200.

A plurality of air intake apertures are disposed on the outer surface of the air intake roller 131. The air intake roller 131 is connected to an external air exhauster. A negative pressure environment is formed around the air intake aperture, so that the gas containing dust 300 is drawn into the air intake roller 131 to remove the dust from the workpiece-to-be-cleaned 200.

Figure 3:
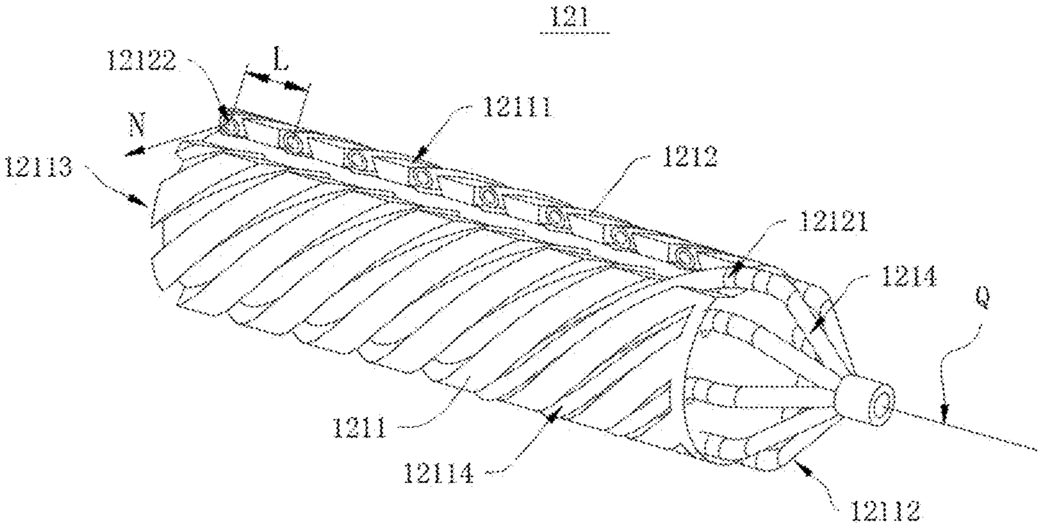
FIG. 3 is a schematic structural diagram of a form of an air-blowing roller according to some embodiments of this application.
Figure 4:
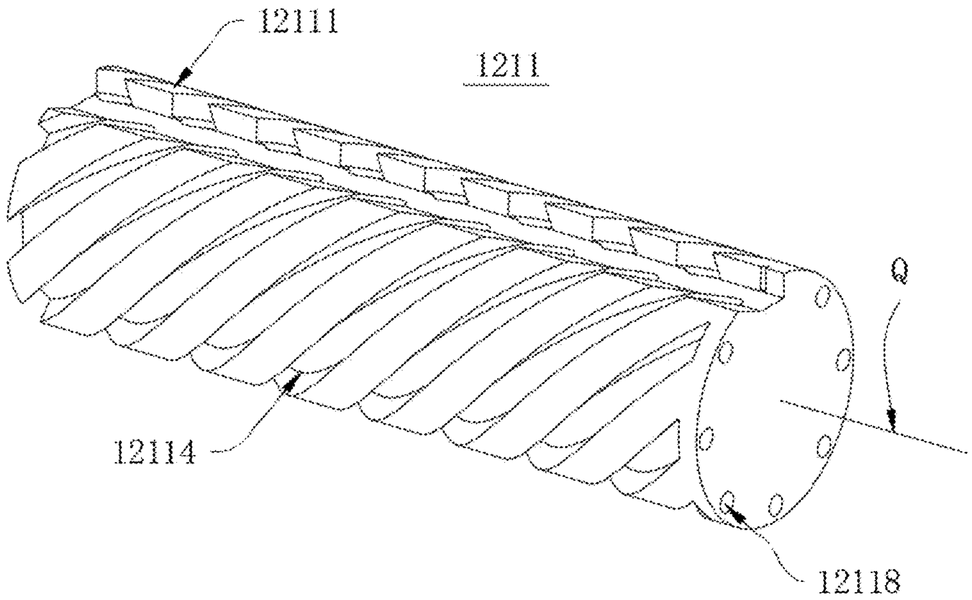
FIG. 4 is a schematic structural diagram of a roller body of the air-blowing roller shown in FIG. 3.

FIG. 3 is a schematic structural diagram of a form of an air-blowing roller according to some embodiments of this application, and FIG. 4 is a schematic structural diagram of a roller body of the air-blowing roller shown in FIG. 3.

As shown in FIG. 3 and FIG. 4, some embodiments of this application disclose an air-blowing roller 121, including: a roller body 1211. A plurality of air outlets 12122 are disposed on an outer peripheral surface 12111 of the roller body 1211. The plurality of air outlets 12122 are arranged along an axial direction of the roller body 1211. An air exhaust direction of the air outlets 12122 is tangent to the outer peripheral surface 12111 of the roller body 1211, and air exhaust directions of the plurality of air outlets 12122 are consistent.

The central axis of the roller body 1211 extends along a first axis Q. The two circumferential ends of the roller body 1211 are a first end 12112 and a second end 12113 respectively. The air exhaust direction of the air outlets 12122 is a second preset direction N.

Understandably, the outer peripheral surface 12111 of the roller body 1211 means a surface that extends circumferentially around the central axis (that is, the first axis Q) of the roller body 1211, where a normal direction of the surface extends along a radial direction of the roller body 1211. The second preset direction may be perpendicular to the first axis Q, or may be inclined to the first axis Q.

The plurality of air outlets 12122 are spaced apart along the first axis Q. The spacings between every two adjacent air outlets 12122 may be the same or different. The plurality of air outlets 12122 may be distributed from the first end 12112 to the second end 12113 of the roller body 1211 along the first axis Q, or may be distributed in a section of the space between the first end 12112 and the second end 12113 of the roller body 1211 along the first axis Q. The air outlets 12122 may directly protrude beyond the outer peripheral surface 12111 of the roller body 1211. A recessed portion may be further disposed on the outer peripheral surface 12111 of the roller body 1211. The air outlets 12122 are disposed in the recessed portion. The shape of the air outlets 12122 may be square, circular, or the like.

The air-blowing roller 121 according to this embodiment of this application drives the air outlets 12122 to move synchronously during rotation. On the one hand, during the rotation of the air-blowing roller 121, the air outlets 12122 of the air-blowing roller 121 gradually approach the surface of the workpiece-to-be-cleaned 200. The air exhaust direction of the air outlets 12122 change from a direction perpendicular to the surface of the workpiece-to-be-cleaned 200 to a direction parallel to the surface of the workpiece-to-be-cleaned 200. The air outlet 12122 side of the air-blowing roller 121 is close to the surface of the workpiece-to-be-cleaned 200. In the volume of air exhausted from the air outlets, a component perpendicular to the surface of the workpiece-to-be-cleaned 200 gradually decreases. When the air outlets 12122 are closest to the surface of the workpiece-to-be-cleaned 200, the air exhaust direction of the air outlets 12122 is parallel to the surface of the workpiece-to-be-cleaned 200, thereby preventing dust from being embedded into the surface of the workpiece-to-be-cleaned 200. On the other hand, during rotation of the air-blowing roller 121, when the air exhaust direction of the air outlets 12122 is parallel to the surface of the workpiece-to-be-cleaned 200, the airflow from the air outlets 12122 is endowed with an initial speed of leaving the surface of the workpiece-to-be-cleaned 200 when being exhausted along a tangential direction of the roller body 1211, thereby lifting the dust from the surface of the workpiece-to-be-cleaned 200 of the product, bringing the dust away from the surface of the workpiece-to-be-cleaned 200, and achieving a good dusting effect.

As shown in FIG. 3, in some embodiments of this application, the air exhaust direction of the air outlets 12122 is inclined to the central axis (that is, the first axis Q) of the roller body 1211.

The first axis Q is parallel to the width direction of the workpiece-to-be-cleaned 200, and the second preset direction N is inclined to the first axis Q. When the roller body 1211 rotates so that the air exhaust direction of the air outlets 12122 is parallel to the surface of the workpiece-to-be-cleaned 200, the air exhaust direction of the air outlets 12122 is inclined to the conveyance direction (that is, the preset direction P) of the workpiece-to-be-cleaned 200.

Specifically, an angle between the air exhaust direction (that is, the second preset direction N) of the air outlets 12122 and the conveyance direction (that is, the preset direction P) of the workpiece-to-be-cleaned 200 is an acute angle. For example, the angle between the second preset direction N and the preset direction P may be 30°, 45°, or the like. The air outlets 12122 supply air roughly along the conveyance direction of the workpieces-to-be-cleaned 200.

In some other embodiments, the second preset direction N may be perpendicular to the first axis Q, that is, the air exhaust direction of the air outlets 12122 is the same as the conveyance direction of the workpiece-to-be-cleaned 200.

By inclining the air exhaust direction of the air outlets 12122 to the conveyance direction of the workpiece-to-be-cleaned 200, the dust 300 can be brought away from the workpiece-to-be-cleaned 200 from a widthwise edge of the workpiece-to-be-cleaned 200, thereby improving the dusting effect of the air-blowing roller 121.

As shown in FIG. 3 and FIG. 4, in some embodiments of this application, the air-blowing roller 121 further includes a plurality of ducts 1212. The ducts 1212 extend spirally around the central axis (that is, the first axis Q) of the roller body 1211. One end of each duct 1212 is an air inlet 12121 and another end of each duct is an air outlet 12122. The plurality of ducts 1212 are arranged in parallel.

The ducts 1212 may be blast pipes. The blast pipes are provided independently of, and connected to, the roller body 1211. The ducts 1212 may be air channels disposed inside the roller body 1211 or air channels formed by combining the outer peripheral surface 12111 of the roller body 1211 with another component.

During the spiral extension of a duct 1212 around the first axis Q, the duct 1212 may coil around the roller body 1211 with an equal coiling radius in each coil. Alternatively, the coiling radii of the duct 1212 may gradually increase along a direction from the air inlet 12121 to the air outlet 12122. The “coiling radius” means a distance between a point on the duct 1212 and the first axis Q.

The number of the ducts 1212 is in one-to-one correspondence with the number of air outlets 12122. For example, eight ducts 1212 are disposed, and correspondingly, eight air outlets 12122 are disposed. One duct 1212 corresponds to one air inlet 12121, so that the air volume from each air outlet 12122 is approximately uniform. In some other embodiments, one duct 1212 may correspond to a plurality of air outlets 12122, thereby reducing the number of ducts 1212 and simplifying the structure of the air-blowing roller 121. For example, four ducts 1212 and eight air outlets 12122 are disposed. One duct 1212 corresponds to two air outlets 12122. An end of the duct 1212, away from the air inlet 12121, may be connected to two sub-ducts concurrently, an air outlet 12122 is disposed at the end of each sub-duct. Alternatively, an opening at the end of the duct 1212, away from the air inlet 12121, is partitioned off to form two air outlets 12122.

The air inlets 12121 of the plurality of ducts 1212 may be centrally located at a first end 12112 or a second end 12113 of the roller body 1211, so as to communicate with an external air source. Alternatively, depending on actual requirements, the air inlets 12121 of the plurality of ducts 1212 may be partially disposed at the first end 12112 of the roller body 1211 and partially disposed at the second end 12113 of the roller body 1211. The first end 12112 and the second end 12113 of the roller body 1211 communicate with an external air source separately.

Along the direction from the first end 12112 to the second end 12113 of the roller body 1211, the arrangement sequence of the ducts 1212 is the same as the arrangement sequence of the corresponding air outlets 12122 of the ducts 1212. In other words, the length and the coiling angle of the duct 1212 of the air outlet 12122 closest to the first end 12112 of the roller body 1211 are the smallest. Along the direction from the first end 12112 to the second end 12113 of the roller body 1211, the lengths and the coiling angles of the ducts 1212 gradually increase. The air outlets 12122 of all the ducts 1212 are arranged in sequence along the direction from the first end 12112 to the second end 12113. The length and the coiling angle of the duct 1212 of the air outlet 12122 closest to the second end 12113 of the roller body 1211 are the largest. The maximum coiling angle of the duct is 360°, that is, the duct coils around the roller body 1211 for one circle, so as to avoid the air exhaust direction of the air outlet 12122.

Using an implementation as an example in which the air inlets 12121 of a plurality of ducts 1212 are centrally disposed at the first end 12112 of the roller body 1211, the air inlet 12121 of each duct 1212 is disposed at the first end 12112 of the roller body 1211. The duct 1212 coils around the first axis Q on the outer peripheral surface 12111 of the roller body 1211. One end of the duct 1212 provides an air inlet 12121 at the first end 12112 of the roller body 1211, and the other end of the duct provides an air outlet 12122 exposed on the outer peripheral surface 12111 of the roller body 1211. The air outlets 12122 of a plurality of ducts 1212 are spaced apart on the roller body 1211 along the first axis Q. The same duct 1212 coils around the roller body 1211 with an equal coiling radius in each coil.

In some other embodiments, a plurality of ducts 1212 may be disposed inside the roller body 1211 instead; or, an inner cavity is created inside the roller body 1211, and the inner cavity communicates with an external air source. The air inlets 12121 of all the ducts 1212 communicate with the inner cavity to implement the communication between the air source and the air outlet 12122.

Through the above configuration, each air outlet 12122 corresponds to an duct 1212, thereby improving uniformity of the air volume between a plurality of air outlets 12122. The ducts 1212 extend spirally around the central axis of the roller body 1211, thereby causing the air direction in the ducts 1212 to extend spirally around the central axis of the roller body 1211. The extension direction of the ducts 1212 is the same as the air exhaust direction of the air outlets 12122, and the exhaust air resistance of the ducts 1212 is relatively small, thereby achieving a good denoising effect.

In some embodiments of this application, spacings between every two adjacent ducts 1212 are identical.

As shown in FIG. 3 and FIG. 4, understandably, the “spacing between two adjacent ducts 1212” means a spacing L between one duct 1212 and the adjacent duct 1212 along the first axis Q.

Using an implementation as an example in which two adjacent ducts 1212 are arranged in parallel, a plurality of air outlets 12122 are arranged at equal intervals along the first axis Q, so as to cause the air-blowing roller 121 to exhaust air uniformly along the axial direction of the air-blowing roller.

Through the above configuration, a plurality of ducts 1212 are evenly arranged on the roller body 1211, thereby simplifying the structure of the air-blowing roller 121 and facilitating the assembling and maintenance of the air-blowing roller 121. The spacings between every two adjacent air outlets 12122 are identical.

In some embodiments of this application, a plurality of spiral grooves 12114 are disposed on the outer peripheral surface 12111 of the roller body 1211. The spiral grooves 12114 spirally extend around the central axis (that is, the first axis Q) of the roller body 1211. The plurality of spiral grooves 12114 are arranged in parallel. The ducts 1212 are blast pipes. The plurality of blast pipes are correspondingly embedded in the plurality of spiral grooves 12114.

The roller body 1211 may be made of copper, aluminum, stainless steel, or the like, or may be made of a plastic material or the like. The material is not limited herein. The spiral groove 12114 may be formed by planing and milling or directly formed on the surface of the roller body 1211. For example, a spiral groove may be formed on the outer peripheral surface 12111 of the roller body 1211 by planing and milling. The blast pipe is embedded in the corresponding spiral groove 12114 based on the actual length, and occupies at least a part of the spiral groove 12114 along the first axis Q. The spiral groove 12114 may run through the roller body 1211 at two ends of the spiral groove to simplify the processing of the spiral groove 12114. Alternatively, the spiral groove 12114 may be arranged without running through the roller body 1211 at one or two ends of the spiral groove, so as to facilitate the positioning and mounting of the blast pipe.

The blast pipe may be a metal pipe such as a copper pipe or an aluminum pipe, or may be a composite pipe such as a PVC pipe. Along a radial direction of the roller body 1211, the blast pipe may be fully embedded in the spiral groove 12114, that is, the blast pipe does not protrude beyond the outer peripheral surface 12111 of the roller body 1211. Alternatively, the blast pipe may be partially embedded in the spiral groove 12114, that is, the blast pipe partially protrudes beyond the outer peripheral surface 12111 of the roller body 1211.

Optionally, the blast pipe may be fixed to the roller body 1211 by welding or bonding, or may be fixed to the roller body 1211 with the aid of an external connecting piece, or may be fixed to the roller body 1211 through a structure that fits the surface of the roller body 1211.

As shown in FIG. 3 and FIG. 4, in some embodiments of this application, a via-hole 12118 is disposed on an edge at a first end 12112 of the roller body 1211. One end of the via-hole 12118 communicates with the spiral groove 12114, and the other end of the via-hole extends to a lateral side of the roller body 1211 at the first end 12112 of the roller body. The blast pipe passes through the via-hole 12118. A section of the blast pipe, which is located on a side of the via-hole 12118, is bent, so as to be connected to the first end 12112 of the roller body 1211. A section of the blast pipe, which is located in the spiral groove 12114, is connected to the roller body 1211 by welding or bonding at a plurality of points.

In some other embodiments, no spiral groove 12114 is disposed on the outer peripheral surface 12111 of the roller body 1211, and the blast pipe spirally coils around the outer peripheral surface 12111 of the roller body 1211, so as to reduce the manufacturing cost of the roller body 1211.

Through the above configuration, the structure of the roller body 1211 is simplified, and the molding cost of the ducts 1212 is reduced. The blast pipes are embedded in the corresponding spiral grooves 12114, thereby not only facilitating the fixing and assembling of the blast pipes to the roller body 1211, but also reducing the increment in the outer dimension of the air-blowing roller 121 caused by the mounting of the blast pipes, thereby making the air-blowing roller 121 structurally compact and space-efficient.

Figure 5:
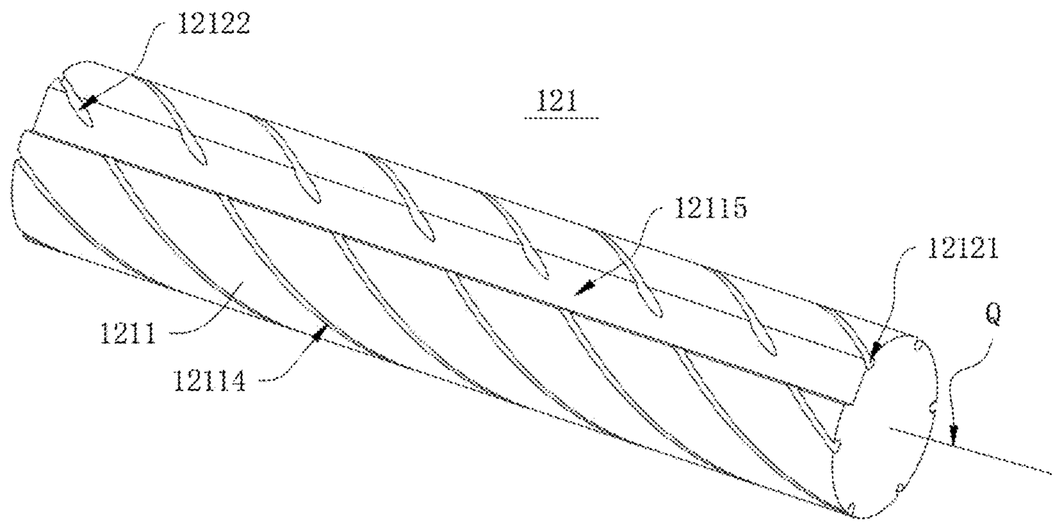
FIG. 5 is a schematic structural diagram of another form of an air-blowing roller according to some embodiments of this application (without showing a housing)
Figure 6:
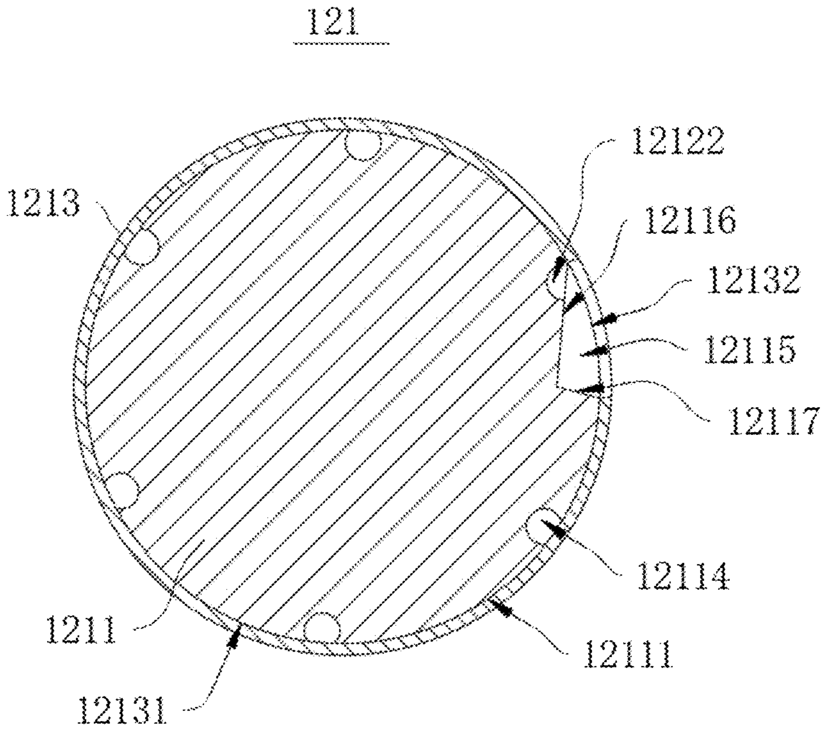
FIG. 6 is a cross-sectional view of another form of an air-blowing roller according to some embodiments of this application.

FIG. 5 is a schematic structural diagram of another form of an air-blowing roller according to some embodiments of this application (without showing a housing), and FIG. 6 is a cross-sectional view of another form of an air-blowing roller according to some embodiments of this application.

As shown in FIG. 5 and FIG. 6, in some embodiments of this application, a plurality of spiral grooves 12114 are disposed on the outer peripheral surface 12111 of the roller body 1211. The spiral grooves 12114 spirally extend around the central axis (that is, the first axis Q) of the roller body 1211. The plurality of spiral grooves 12114 are arranged in parallel. The air-blowing roller 121 further includes a housing 1213. The housing 1213 covers the outer peripheral surface 12111 of the roller body 1211. The spiral grooves 12114 and the inner wall 12131 of the housing 1213 jointly define the ducts 1212.

As shown in FIG. 6, the housing 1213 covers the outer peripheral surface 12111 of the roller body 1211. Air vents 12132 corresponding to the plurality of air outlets 12122 are disposed on the housing 1213. The air vents 12132 expose the plurality of air outlets 12122. The housing 1213 is rotatably mounted on an external rack. The housing 1213 is fixed to the roller body 1211 so as to rotate synchronously with the roller body 1211.

The material of the housing 1213 may be the same as the material of the roller body 1211, or may be different from the material of the roller body 1211.

The "inner wall 12131 of the housing 1213" means a surface of the housing 1213, the surface being oriented toward the outer peripheral surface 12111 of the roller body 1211. In some embodiments of this application, the inner wall 12131 of the housing 1213 may be disposed in close fit with the outer peripheral surface 12111 of the roller body 1211. The inner wall 12131 of the housing 1213 and the spiral groove 12114 are combined to jointly form a circumferentially closed duct 1212. In some other embodiments, a gap may exist between the inner wall 12131 of the housing 1213 and the outer peripheral surface 12111 of the roller body 1211. The inner wall 12131 of the housing 1213 and the spiral groove 12114 are combined to jointly form a circumferentially unclosed duct 1212. The space between the inside of the housing 1213 and the outer peripheral surface 12111 of the roller body 1211 is also used for passage of air. The edge of the air vent 12132 of the housing 1213 is disposed in close fit with the outer peripheral surface 12111 of the roller body 1211, so that the inner wall 12131 of the housing 1213 and the spiral groove 12114 form a circumferentially closed air outlet 12122.

The housing 1213 may cover the outer peripheral surface 12111 of the roller body 1211 in diverse ways of implementation. In some embodiments of this application, the housing 1213 wraps the roller body 1211 in a circumferential direction around the central axis (that is, the first axis Q) of the roller body 1211, and an opening of the housing is created at a position corresponding to the first end 12112 on the roller body 1211. The first end 12112 of the duct 1212 is connected to the external air source through the opening.

The air-blowing roller 121 is connected to a driving apparatus, so that the air-blowing roller rotates around the first axis Q through the driving apparatus. Specifically, the driving apparatus may be drivingly connected to the second end 12113 of the roller body 1211, or drivingly connected to the housing 1213. The driving apparatus includes but is not limited to a motor.

Through the above configuration, the spiral grooves 12114 and the inner wall 12131 of the housing 1213 jointly define the ducts 1212, thereby reducing the number of components of the air-blowing roller 121 and simplifying the structure of the air-blowing roller 121.

As shown in FIG. 5 and FIG. 6, in some embodiments of this application, a relief groove 12115 is disposed on the outer peripheral surface 12111 of the roller body 1211. The relief groove 12115 extends along the axial direction (that is, the first axis Q) of the roller body 1211. The air outlets 12122 are disposed on a sidewall of the relief groove 12115.

Specifically, the relief groove 12115 is formed by inwardly recessing the outer peripheral surface 12111 of the roller body 1211. The relief groove 12115 includes a first sidewall 12116 and a second sidewall 12117. Along the circumferential direction of the roller body 1211 (that is, around the first axis Q), one side of the first sidewall 12116 is connected to the outer peripheral surface 12111 of the roller body 1211, and the other side of the first sidewall is connected to one side of the second sidewall 12117. The other side of the second sidewall 12117 is connected to the outer peripheral surface 12111 of the roller body 1211. The air outlets 12122 are disposed on the first sidewall 12116. The second sidewall 12117 is disposed parallel to the air exhaust direction (that is, the second preset direction N) of the air outlets 12122, so that the airflow from the air outlets 12122 can smoothly blow to the surface of workpiece-to-be-cleaned 200. In some other embodiments, the second sidewall 12117 may be inclined toward the inside of the roller body 1211 based on the air exhaust direction of the air outlets 12122, so as to avoid the airflow exhausted from the air outlets 12122.

The number of relief grooves 12115 may be one. One relief groove 12115 may run through the roller body 1211 along the first axis Q, or may be disposed just in a position at which an air outlet 12122 is created. The number of relief grooves 12115 may be plural. The plurality of relief grooves 12115 are spaced apart along the first axis Q. The positions of the relief grooves 12115 correspond to the positions of the air outlets 12122.

Through the above configuration, by disposing the relief grooves 12115 on the outer peripheral surface 12111 of the roller body 1211, the airflow path from the air outlets 12122 is smoothed. The air outlet 12122 is disposed on a sidewall of the relief groove 12115. The air outlets 12122 are disposed without additionally increasing the outer diameter dimension of the roller body 1211, thereby making the air-blowing roller 121 structurally compact and space-efficient.

Figure 7:
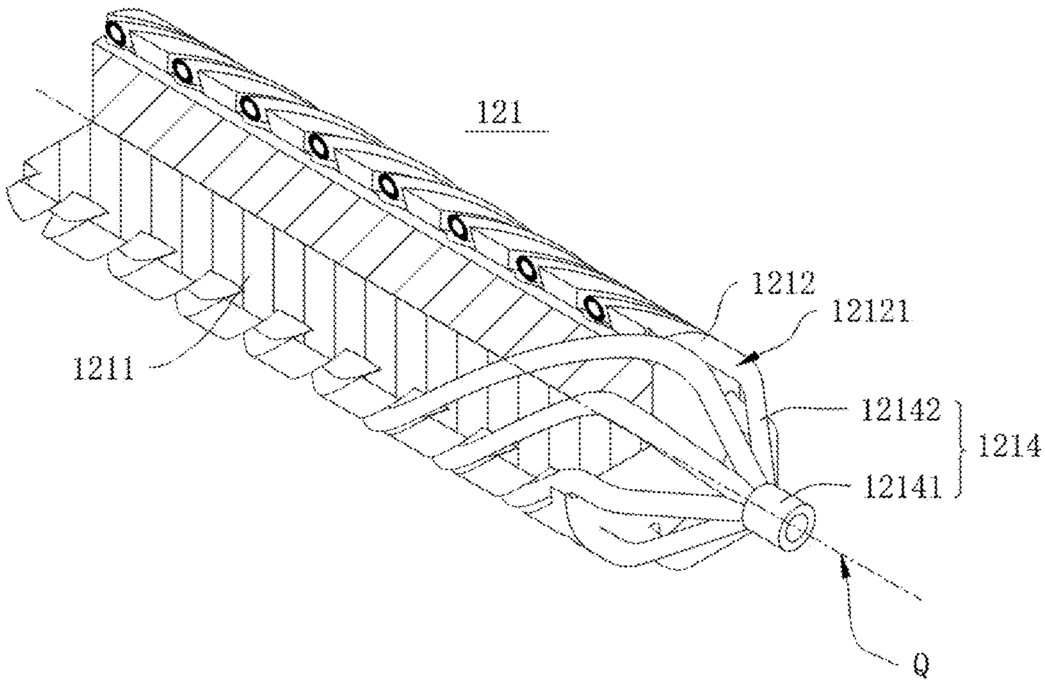
FIG. 7 is a cross-sectional schematic view of the air-blowing roller shown in FIG. 3.

FIG. 7 is a cross-sectional schematic view of the air-blowing roller shown in FIG. 3.

As shown in FIG. 7, in some embodiments of this application, the air-blowing roller 121 further includes an air inlet portion 1214. The air inlet portion 1214 is located at one end of the roller body 1211. The air inlet 12121 of each duct 1212 communicates with the air inlet portion 1214.

Specifically, in an example in which the air inlet portion 1214 is located at the first end 12112 of the roller body 1211, the air inlet portion 1214 is configured to draw in an external air source and send the airflow into a plurality of ducts 1212. The air inlet portion 1214 may be a pipe or an inner cavity of the roller body 1211.

In some other embodiments, the air inlet portion 1214 may be omitted, and the air inlet 12121 of the duct 1212 may be directly connected to the external air source.

Further, a plurality of ducts 1212 may be evenly arranged around an opening of the air inlet portion 1214 circumferentially, the opening being connected to the air source. The air inlets 12121 of all ducts 1212 are in the same shape. After the air source enters the air inlet portion 1214, the air volume is equalized between the ducts, so that the air volume in each duct 1212 is the same, and the air volume at the air outlet 12122 corresponding to each duct 1212 is the same, thereby causing the air-blowing roller 121 to exhaust air uniformly in the axial direction.

Through the above configuration, the air inlet portion 1214 communicates with a plurality of air inlets 12121. The air source enters each duct 1212 through the air inlet portion 1214. The air source includes a connector that communicates with the air inlet portion 1214, thereby simplifying the structure of the air source.

In some embodiments of this application, the air inlet portion 1214 includes a main pipe 12141 and a plurality of branch pipes 12142. The main pipe 12141 is configured to be connected to an air source. The plurality of branch pipes 12142 are disposed corresponding to the plurality of ducts 1212. One end of each branch pipe 12142 is connected to the main pipe 12141. Another end of each branch pipe is connected to a corresponding duct 1212.

Using an implementation as an example in which the duct 1212 is a blast pipe, the materials of the main pipe 12141 and the plurality of branch pipes 12142 may be the same as or different from the material of the blast pipe. The material is not limited herein. The main pipe 12141 is connected to one end of the branch pipes 12142 by welding. The other end of the branch pipes 12142 is formed together with the blast pipe in one piece to let the external air source into the blast pipe. Using an implementation as an example in which the spiral groove 12114 and the inner wall 12131 of the housing 1213 jointly define the duct 1212, the spiral groove 12114 runs through to the sidewall at the first end 12112. One end of the branch pipe 12142 is connected to the main pipe 12141, and the other end of the branch pipe communicates with the spiral groove 12114, so as to guide the airflow into the duct 1212.

In some other embodiments, the air inlet portion 1214 may be formed inside the roller body 1211 or in a space between the roller body 1211 and the housing 1213.

Through the above configuration, the air source enters the corresponding duct 1212 through the main pipe 12141 and branch pipe 12142, and exits from the corresponding air outlet 12122. During supply of air, the air source does not accumulate inside the air-blowing roller 121. The air volume from the air source is identical to the air volume from the air-blowing roller 121, thereby effectively reducing the depletion of the air source during conveyance.

Some embodiments of this application disclose a dust removal apparatus 100, including a conveyance mechanism 110 and an air-blowing roller 121. The conveyance mechanism 110 is configured to convey a workpiece-to-be-cleaned 200. The air-blowing roller 121 is disposed downstream of the conveyance mechanism 110. The air-blowing roller 121 is configured to blow air to a surface of the workpiece-to-be-cleaned 200.

In the dust removal apparatus 100 disclosed in an embodiment of this application, the conveyance mechanism 110 conveys the workpiece-to-be-cleaned 200, and the air-blowing roller 121 blows air to the surface of the workpiece-to-be-cleaned 200. On the one hand, the air outlet 12122 side of the air-blowing roller 121 is close to the surface of the workpiece-to-be-cleaned 200. In the volume of air exhausted from the air outlets, a component perpendicular to the surface of the workpiece-to-be-cleaned 200 gradually decreases, thereby preventing the dust from being blown onto the surface of the workpiece-to-be-cleaned 200. On the other hand, when the air outlets 12122 are away from the surface of the workpiece-to-be-cleaned 200, the airflow from the air outlets lifts the dust away from the surface of the workpiece-to-be-cleaned 200, thereby preventing the dust from accumulating on the surface of the workpiece-to-be-cleaned 200. Due to the characteristics of the air-blowing roller 121, the dust removal apparatus for the workpiece-to-be-cleaned 200 also achieves a good dusting effect.

In some embodiments of this application, a pair of air-blowing rollers 121 are disposed, and a gap available for the workpiece-to-be-cleaned 200 to pass through exists between the air-blowing rollers 121 in the pair.

Through the above configuration, the workpiece-to-be-cleaned 200 passes through the gap between the air-blowing rollers 121 in the pair. Each air-blowing roller 121 corresponds to a surface of the workpiece-to-be-cleaned 200 on one side. In this way, both surfaces of the workpiece-to-be-cleaned 200 can be dusted simultaneously, thereby achieving a good dusting effect.

In some embodiments of this application, the dust removal apparatus for the workpiece-to-be-cleaned 200 further includes an air intake roller 131. The air intake roller 131 is located downstream of the air-blowing roller 121 along a conveyance direction of the piece-to-be-cleaned 200.

Through the above configuration, the air intake roller 131 is disposed downstream of the air-blowing roller 121, and guides the exhaust air flow from the air-blowing roller 121 into the air intake roller 131. In this way, the dust 300 on the surface of the workpieces-to-be-cleaned 200 is taken away by the exhaust air flow, thereby achieving a good dusting effect.

Figure 8:
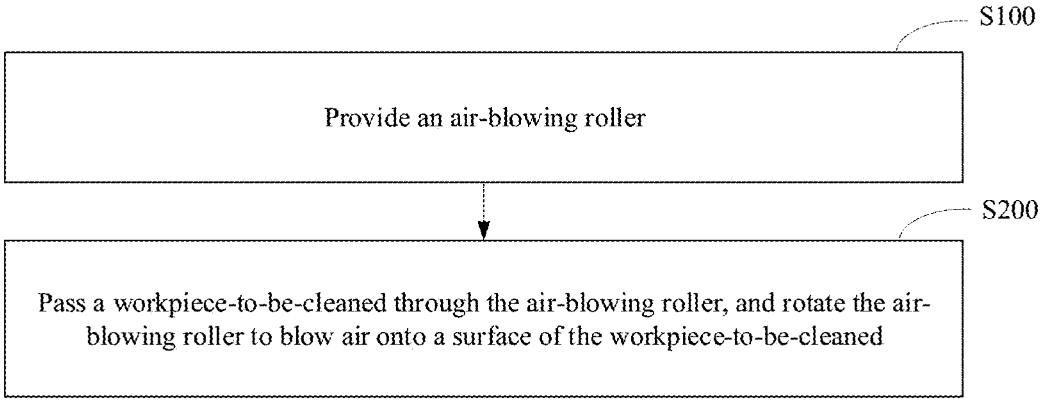
FIG. 8 is a working principle diagram of a first implementation of a dust removal method according to some embodiments of this application.

FIG. 8 is a working principle diagram of a first implementation of a dust removal method according to some embodiments of this application.

As shown in FIG. 8, some embodiments of this application disclose a dust removal method, including:

- S100: Providing an air-blowing roller 121, where the air-blowing roller 121 includes: a roller body 1211, a plurality of air outlets 12122 are disposed on an outer peripheral surface 12111 of the roller body 1211, the plurality of air outlets 12122 are arranged along an axial direction of the roller body 1211, an air exhaust direction of the air outlets 12122 is tangent to the outer peripheral surface 12111 of the roller body 1211, and air exhaust directions of the plurality of air outlets 12122 are consistent; and
- S200: Passing a workpiece-to-be-cleaned 200 through the air-blowing roller 121, and rotating the air-blowing roller 121 to blow air onto a surface of the workpiece-to-be-cleaned 200.

In the dust removal method in some embodiments of this application, on the one hand, the air outlet 12122 side of the air-blowing roller 121 is close to the surface of the workpiece-to-be-cleaned 200. In the volume of air exhausted from the air outlets, a component perpendicular to the surface of the workpiece-to-be-cleaned 200 gradually decreases, thereby preventing the dust from being blown onto the surface of the workpiece-to-be-cleaned 200. On the other hand, when the air outlets 12122 are away from the surface of the workpiece-to-be-cleaned 200, the airflow from the air outlets lifts the dust away from the surface of the workpiece-to-be-cleaned 200, thereby preventing the dust from accumulating on the surface of the workpiece-to-be-cleaned 200. Due to the characteristics of the air-blowing roller 121, the dust removal method for the workpiece-to-be-cleaned 200 can effectively remove the dust 300 on the surface of the workpiece-to-be-cleaned 200, and achieves a good dusting effect.

Figure 9:
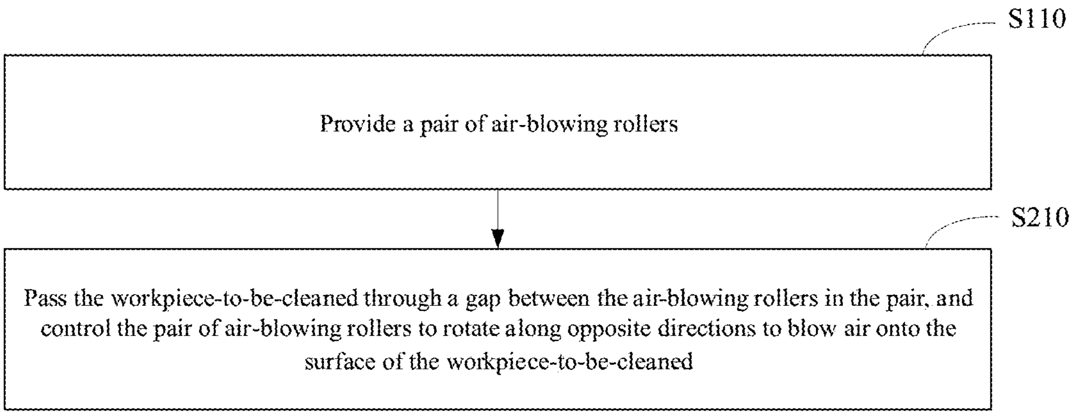
FIG. 9 is a working principle diagram of a second implementation of a dust removal method according to some embodiments of this application.

FIG. 9 is a working principle diagram of a second implementation of a dust removal method according to some embodiments of this application.

As shown in FIG. 9, in some embodiments of this application, the dust removal method further includes:

- S110: Providing a pair of air-blowing rollers 121; and
- S210: Passing the workpiece-to-be-cleaned 200 through a gap between the air-blowing rollers 121 in the pair, and controlling the pair of air-blowing rollers 121 to rotate along opposite directions to blow air onto the surface of the workpiece-to-be-cleaned 200.

Figure 10:
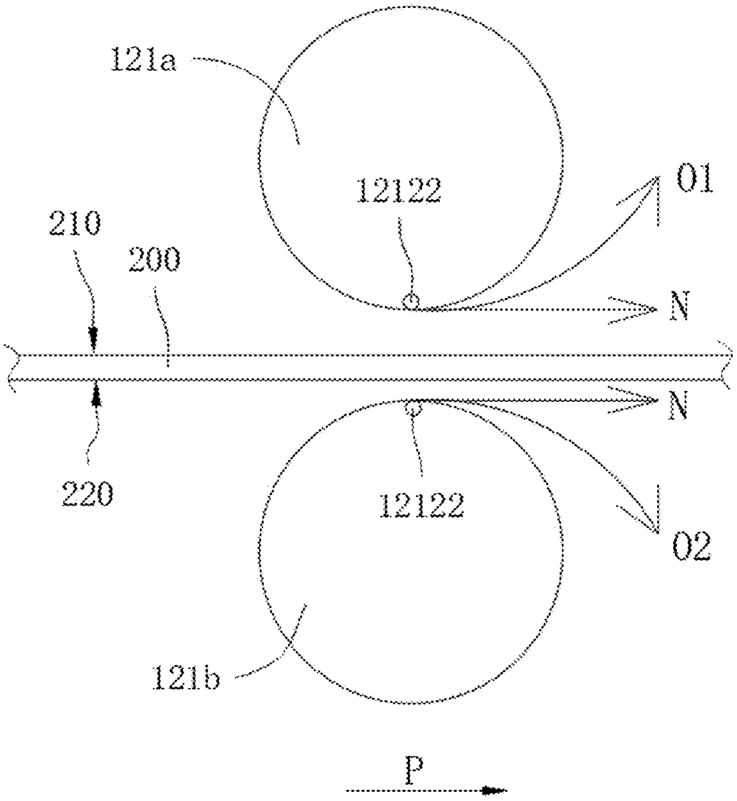
FIG. 10 is a schematic diagram of a pair of air-blowing rollers rotating along opposite directions in a dust removal method according to some embodiments of this application.

FIG. 10 is a schematic diagram of a pair of air-blowing rollers rotating along opposite directions in a dust removal method according to some embodiments of this application.

As shown in FIG. 10, based on the preceding implementation in which the "first preset direction P" extends along the horizontal direction, the two air-blowing rollers 121 are a first air-blowing roller 121*a* and a second air-blowing roller 121*b* respectively. The first air-blowing roller 121*a* is located on an upper side of the workpiece-to-be-cleaned 200 and corresponds to the first surface 210. The second air-blowing roller 121*b* is located on a lower side of the workpiece-to-be-cleaned 200 and corresponds to the second surface 220. The first air-blowing roller 121*a* rotates around a third preset direction O1. The second air-blowing roller 121*b* rotates around a fourth preset direction O2. The third preset direction O1 is opposite to the fourth preset direction O2.

The air volume from the air outlet 12122 of the air-blowing roller 121 includes a component blowing in a direction identical to a rotation direction of the air-blowing roller 121. In this way, the airflow from the air outlet 12122 is endowed with a rotating initial speed of the air-blowing roller 121, and can drive the dust 300 to move away from the surface of the workpiece-to-be-cleaned 200, thereby making it convenient for the downstream air intake roller 131 to draw in the dust under a negative pressure.

A phase difference does not necessarily exist between the first air-blowing roller 121*a* and the second air-blowing roller 121*b* during rotation. The air outlet 12122 of the first air-blowing roller 121*a* and the air outlet of the second air-blowing roller 121*b* move closer to the surface of the workpiece-to-be-cleaned 200 or away from the surface of the workpiece-to-be-cleaned 200 synchronously. Alternatively, a phase difference of the rotation phase may exist between the first air-blowing roller 121*a* and the second air-blowing roller 121*b*. When the air outlet 12122 of the first air-blowing roller 121*a* moves closer to the surface of the workpiece-to-be-cleaned 200, the second air-blowing roller 121*b* moves away from the surface of the workpiece-to-be-cleaned 200, so that the air outlet 12122 of the first air-blowing roller 121*a* and the air outlet of the second air-blowing roller 121*b* alternately blow air toward the surface of the workpiece-to-be-cleaned 200.

Through the above configuration, the workpiece-to-be-cleaned 200 passes through the gap between the air-blowing rollers 121 in the pair. Each air-blowing roller 121 corresponds to a surface of the workpiece-to-be-cleaned 200 on one side. The air-blowing rollers 121 in the pair rotate in opposite directions to remove dust from both surfaces of the workpiece-to-be-cleaned 200 simultaneously, thereby achieving a good dusting effect.

Figure 11:
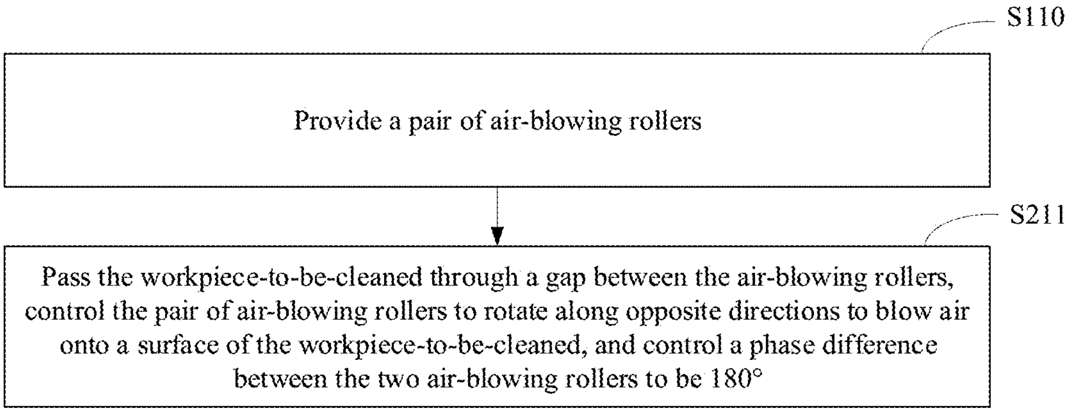
FIG. 11 is a working principle diagram of a third implementation of a dust removal method according to some embodiments of this application.
Figure 12:
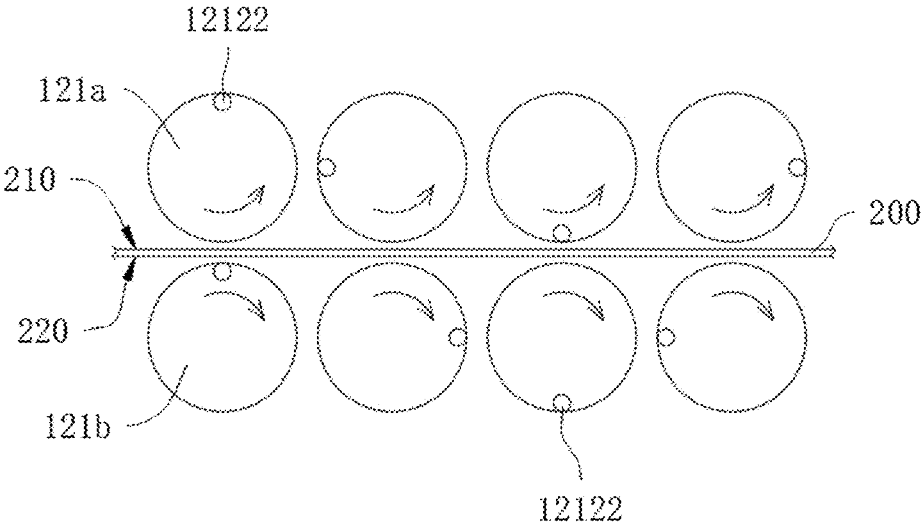
FIG. 12 is a schematic diagram of phase change between two air-blowing rollers in a dust removal method according to some embodiments of this application.

FIG. 11 is a working principle diagram of a third implementation of a dust removal method according to some embodiments of this application, and FIG. 12 is a schematic diagram of phase change between two air-blowing rollers in a dust removal method according to some embodiments of this application.

As shown in FIG. 11 and FIG. 12, in some embodiments of this application, the step of S210 "controlling the pair of air-blowing rollers 121 to rotate along opposite directions to blow air onto the surface of the workpiece-to-be-cleaned 200" includes:

S211: Controlling a rotational phase difference between the two air-blowing rollers 121 to be 180°, so that the two air-blowing rollers 121 alternately blow air to the surface of the workpiece-to-be-cleaned 200.

Specifically, the phase difference between the air outlet 12122 of one air-blowing roller 121 and the air outlet 12122 of the other air-blowing roller 121 is 180°.

As shown in FIG. 12, in some embodiments of this application, during rotation of the first air-blowing roller 121*a*, when the air outlet 12122 of the first air-blowing roller 121*a* is closest to the first surface 210, the air outlet 12122 of the second air-blowing roller 121*b* is farthest from the second surface 220. When the air outlet 12122 of the first air-blowing roller 121*a* is farthest from the first surface 210, the air outlet 12122 of the second air-blowing roller 121*b* is closest to the second surface 220.

In other embodiments, the phase difference between the air outlet 12122 of the first air-blowing roller 121*a* and the air outlet 12122 of the second air-blowing roller 121*b* may be 90°, 270°, or the like.

Through the above configuration, the two air-blowing rollers 121 are disposed on the two sides of the workpiece-to-be-cleaned 200 respectively. The two air-blowing rollers 121 alternately blow air to the surface of the workpiece-to-be-cleaned 200, and alternately apply an air pressure to both surfaces of the workpiece-to-be-cleaned 200, thereby causing the workpiece-to-be-cleaned 200 to shake off the dust and separate the dust from the surface of the workpiece-to-be-cleaned 200, and achieving a good dusting effect.

Figure 13:
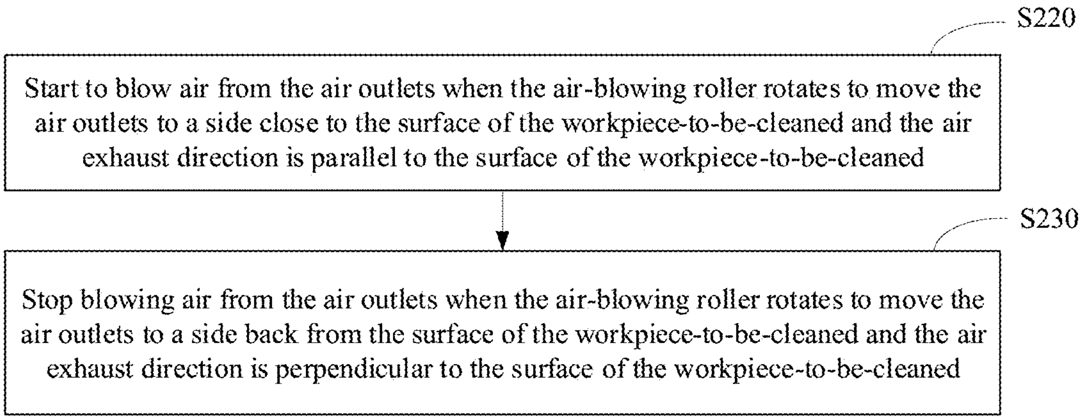
FIG. 13 is a working principle diagram of a fourth implementation of a dust removal method according to some embodiments of this application.

FIG. 13 is a working principle diagram of a fourth implementation of a dust removal method according to some embodiments of this application.

As shown in FIG. 12 and FIG. 13, in some embodiments of this application, the step of S200 "rotating the air-blowing roller 121 to blow air onto a surface of the workpiece-to-be-cleaned 200" includes:

S220: Starting to blow air from the air outlets 12122 when the air-blowing roller 121 rotates to move the air outlets 12122 to a side close to the surface of the workpiece-to-be-cleaned 200 and the air exhaust direction is parallel to the surface of the workpiece-to-be-cleaned 200; and S230: Stopping blowing air from the air outlets 12122 when the air-blowing roller 121 rotates to move the air outlets 12122 to a side back from the surface of the workpiece-to-be-cleaned 200 and the air exhaust direction is perpendicular to the surface of the workpiece-to-be-cleaned 200.

As shown in FIG. 12 and FIG. 13, in some embodiments of this application, during rotation of the first air-blowing roller 121*a*, the air outlet 12122 of the first air-blowing roller 121*a* starts blowing air when the air outlet is about to be closest to the first surface 210, and stops blowing when the air outlet is about to be farthest from the first surface 210. When the air outlet 12122 of the first air-blowing roller 121*a* is about to reach the farthest position away from the first surface 210 and stops blowing, the air outlet 12122 of the second air-blowing roller 121*b* is about to reach the position closest to the second surface 220 and starts blowing air. When the air outlet 12122 of the first air-blowing roller 121*a* is about to reach the position closest to the first surface 210 and starts blowing air, the air outlet 12122 of the second air-blowing roller 121*b* is about to reach the farthest position away from the second surface 220 and stops blowing.

In this way, not only can the air volume required by the air-blowing roller 121 in the dusting operation be reduced to cut back the dusting cost, but also the air blow to the surface of the workpiece-to-be-cleaned 200 can be stopped when the airflow from the air outlets 12122 contains a component blowing vertically to the surface of the workpiece-to-be-cleaned 200, thereby further preventing the dust from being blown onto the surface of the workpiece-to-be-cleaned 200.

In some other embodiments, the first air-blowing roller 121*a* and the second air-blowing roller 121*b* can blow air continuously during rotation, thereby being easy to control.

As shown in FIG. 1 to FIG. 13, some embodiments of this application provide a dust removal apparatus 100 configured to remove dust for an electrode plate. The dust removal apparatus 100 includes a conveyance mechanism 110, a pair of air-blowing rollers 121, and a pair of air intake rollers 131. The pair of air-blowing rollers 121 are a pair of spiral air rollers. As conveyed by the conveyance mechanism 110, an electrode plate passes between the upper air-blowing roller 121 and the lower air-blowing roller 121 to remove dust. The dust particles blown off together with the gas blown out are taken away by the air intake roller 131. A group of left-rotating spiral ducts 1212 are arranged on the upper air-blowing roller 121, and a group of right-rotating spiral ducts 1212 are arranged on the lower air-blowing roller 121. A row of air outlets 12122 are created on the plurality of ducts 1212 in a direction parallel to the axial direction of the roller body 1211. During dust removal, the air outlets 12122 of the upper and lower air-blowing rollers 121 blow out spiral eddy air. At the same time, the upper air-blowing roller 121 rotates counterclockwise at a high speed, and the lower air-blowing roller 121 rotates clockwise at a high speed. The flow speed of the eddy air is added to the rotation speed of the air-blowing roller 121, thereby increasing the speed of the eddy air and improving the dusting effect. The duct 1212 may be a blast pipe, or may be formed by combining a spiral groove with a housing. An air inlet portion 1214 is disposed at the first end 12112 of the roller body 1211. The air inlet portion 1214 may include a main pipe 12141 and branch pipes 12142, or may be a uniform air chamber.

As shown in FIG. 1 to FIG. 13, some embodiments of this application further provide a dust removal method to achieve a good dusting effect. The following describes the dust removal method in detail by using a dust removal apparatus 100 as an example. It is hereby noted that the implementation of the dust removal method is not limited to the use of the dust removal apparatus disclosed in an embodiment of this application.

The dust removal method includes:

- conveying an electrode plate by using a conveyance mechanism 110 so that the electrode plate passes through a gap between two spiral air rollers in pairs;
- controlling, by using a motor, a rotational phase difference between an upper air-blowing roller 121 and a lower air-blowing roller 121 to be 180°, so that an upper air outlet 12122 and a lower air outlet 12122 alternately blow air to both sides of the electrode plate, thereby causing the electrode plate to vibrate up and down at high frequency and accelerating the dropping of dust particles; and
- drawing, by the air intake roller 131, air from downstream of the air-blowing roller 121 and drawing out air containing dust particles.

During the dusting for the electrode plate, first of all, because the eddy airflow contains no component blowing vertically to the surface of the electrode plate, sharp burrs are prevented from being squeezed toward the surface of the electrode plate, nor will the burrs be blown to the coating layer. Second, during the rotation of the air-blowing roller 121, the exhaust air direction of the air outlets 12122 overlaps the rotation direction of the air-blowing roller 121, thereby increasing the air speed exhausted by the air-blowing roller 121, and driving the dust to move away from the surface of the electrode plate. Third, the eddy airflow can be broken down into a component oriented back from the surface of the electrode plate and a component extending along the surface of the electrode plate. The component oriented back from the surface of the electrode plate can stimulate the dust to fall off from the surface of the electrode plate. Finally, the upper and lower air-blowing rollers 121 blow air toward the surface of the electrode plate successively to vibrate the electrode plate, thereby shaking off the dust particles, and achieving a good dusting effect.

It is hereby noted that to the extent that no conflict occurs, the features in the embodiments of this application may be combined with each other.

What is described above is merely exemplary embodiments of this application, but is not intended to limit this application. To a person skilled in the art, various modifications and variations may be made to this application. Any and all modifications, equivalent replacements, improvements, and the like made without departing from the spirit and principles of this application still fall within the protection scope of this application.

What is claimed is:

1. An air-blowing roller configured to blow air to a surface of a workpiece-to-be-cleaned, comprising:

a roller body, wherein a plurality of air outlets are disposed on an outer peripheral surface of the roller body, the plurality of air outlets are arranged along an axial direction of the roller body, air exhaust directions of the plurality of air outlets are tangent to the outer peripheral surface of the roller body, the air exhaust directions of the plurality of air outlets are aligned with each other, and the air exhaust directions of the plurality of air outlets are parallel to the surface of the workpiece-to-be-cleaned during rotation of the air-blowing roller; and a plurality of ducts, wherein the plurality of ducts extend spirally around the central axis of the roller body, one end of each duct is an air inlet and another end of each duct is an air outlet, and the plurality of ducts are arranged in parallel.

2. The air-blowing roller according to claim 1, wherein the air exhaust directions of the plurality of air outlets are inclined to a central axis of the roller body.

3. The air-blowing roller according to claim 1, wherein spacings between every two adjacent ducts are identical.

4. The air-blowing roller according to claim 1, wherein a plurality of spiral grooves is disposed on the outer peripheral surface of the roller body, the spiral grooves spirally extend around the central axis of the roller body, the plurality of spiral grooves are arranged in parallel, the ducts are blast pipes, and the plurality of blast pipes are correspondingly embedded in the plurality of spiral grooves.

5. The air-blowing roller according to claim 1, wherein a plurality of spiral grooves are disposed on the outer peripheral surface of the roller body, the spiral grooves spirally extend around the central axis of the roller body, the plurality of spiral grooves are arranged in parallel, the air-blowing roller further comprises a housing, the housing covers the outer peripheral surface of the roller body, and the spiral grooves and an inner wall of the housing jointly define the ducts.

6. The air-blowing roller according to claim 4, wherein a relief groove is disposed on the outer peripheral surface of the roller body, the relief groove extends along the axial direction of the roller body, and the air outlets are disposed on a sidewall of the relief groove.

7. The air-blowing roller according to claim 1, further comprising:

an air inlet portion, wherein the air inlet portion is located at one end of the roller body, and the air inlet of each duct communicates with the air inlet portion.

8. The air-blowing roller according to claim 7, wherein the air inlet portion comprises a main pipe and a plurality of branch pipes, the main pipe is configured to be connected to an air source, and the plurality of branch pipes are disposed corresponding to the plurality of ducts, one end of each branch pipe is connected to the main pipe, and another end of each branch pipe is connected to a corresponding duct.

9. A dust removal apparatus, comprising:

a conveyor, configured to convey the workpiece-to-be-cleaned; and the air-blowing roller according to claim 1, disposed downstream of the conveyor.

10. The dust removal apparatus according to claim 9, wherein a pair of air-blowing rollers are disposed, and a gap available for the workpiece-to-be-cleaned to pass through exists between the air-blowing rollers in the pair.

11. The dust removal apparatus according to claim 9, further comprising:

an air intake roller, located downstream of the air-blowing roller along a conveyance direction of the workpiece-to-be-cleaned.

12. A dust removal method, comprising:

providing the air-blowing roller according to claim 1; and passing the workpiece-to-be-cleaned through the air-blowing roller, and rotating the air-blowing roller to blow the air onto the surface of the workpiece-to-be-cleaned.

13. The dust removal method according to claim 12, further comprising:

providing a pair of air-blowing rollers; and passing the workpiece-to-be-cleaned through a gap between the air-blowing rollers in the pair, and controlling the pair of air-blowing rollers to rotate along opposite directions to blow the air onto the surface of the workpiece-to-be-cleaned.

14. The dust removal method according to claim 13, wherein controlling the pair of air-blowing rollers to rotate along the opposite directions to blow the air onto the surface of the workpiece-to-be-cleaned comprises:

controlling a rotational phase difference between the two air-blowing rollers to be 180°, so that the two air-blowing rollers alternately blow the air to the surface of the workpiece-to-be-cleaned.

15. The dust removal method according to claim 12, wherein rotating the air-blowing roller to blow the air onto the surface of the workpiece-to-be-cleaned comprises:

starting to blow the air from the air outlets when the air-blowing roller rotates to move the plurality of air outlets to a side close to the surface of the workpiece-to-be-cleaned and the air exhaust directions of the plurality of air outlets are parallel to the surface of the workpiece-to-be-cleaned; and stopping blowing air from the air outlets when the air-blowing roller rotates to move the plurality of air outlets to a side back from the surface of the workpiece-to-be-cleaned and the air exhaust directions of the plurality of air outlets are perpendicular to the surface of the workpiece-to-be-cleaned.

16. An air-blowing roller, comprising:

a roller body, wherein a plurality of air outlets are disposed on an outer peripheral surface of the roller body, the plurality of air outlets are arranged along an axial direction of the roller body, air exhaust directions of the plurality of air outlets are tangent to the outer peripheral surface of the roller body, and air exhaust directions of the plurality of air outlets are aligned with each other; and a plurality of ducts, wherein the ducts extend spirally around the central axis of the roller body, one end of each duct is an air inlet and another end of each duct is an air outlet, and the plurality of ducts are arranged in parallel.

* * * * *